United States Patent
Miller

(10) Patent No.: US 12,185,880 B2
(45) Date of Patent: Jan. 7, 2025

(54) HYGIENIC FACE TOWEL

(71) Applicant: Jorge A. Miller, Bronx, NY (US)

(72) Inventor: Jorge A. Miller, Bronx, NY (US)

( * ) Notice: Subject to any disclaimer, the term of this patent is extended or adjusted under 35 U.S.C. 154(b) by 72 days.

(21) Appl. No.: 17/860,738

(22) Filed: Jul. 8, 2022

(65) Prior Publication Data

US 2023/0017209 A1  Jan. 19, 2023

Related U.S. Application Data

(60) Provisional application No. 63/219,725, filed on Jul. 8, 2021.

(51) Int. Cl.
| | | |
|---|---|---|
| *A47K 10/02* | (2006.01) | |
| *B32B 1/00* | (2006.01) | |
| *B32B 5/02* | (2006.01) | |
| *B32B 5/26* | (2006.01) | |

(52) U.S. Cl.
CPC ............. *A47K 10/02* (2013.01); *B32B 1/00* (2013.01); *B32B 5/02* (2013.01); *B32B 5/26* (2013.01); *B32B 2250/02* (2013.01); *B32B 2250/20* (2013.01); *B32B 2307/726* (2013.01); *B32B 2555/00* (2013.01)

(58) Field of Classification Search
CPC .. A47K 10/02; B32B 1/00; B32B 5/02; B32B 5/26; B32B 2250/02; B32B 2250/20; B32B 2307/726; B32B 2555/00
USPC ............................................................ 383/6
See application file for complete search history.

(56) References Cited

U.S. PATENT DOCUMENTS

| | | | | |
|---|---|---|---|---|
| 1,507,707 A | * | 9/1924 | Morganstern | A47L 13/18 D2/622 |
| 2,530,746 A | * | 11/1950 | Wetherby | A63B 47/04 15/210.1 |
| 4,902,283 A | * | 2/1990 | Rojko | A47K 7/02 294/1.3 |
| 5,813,080 A | * | 9/1998 | Hendren | A63B 57/60 15/210.1 |
| 7,797,783 B2 | * | 9/2010 | Chandler | A63B 57/60 15/118 |
| 8,060,969 B2 | * | 11/2011 | Jones | G02C 13/006 15/210.1 |
| 2007/0068612 A1 | * | 3/2007 | Potter | A63B 57/60 150/160 |

* cited by examiner

*Primary Examiner* — Jes F Pascua
(74) *Attorney, Agent, or Firm* — Wilmer Cutler Pickering Hale and Dorr LLP

(57) ABSTRACT

A hygienic face towel that allows a user to maintain a sanitary surface that can be used to contact a person's body thereby preventing transfer of contaminants that may be on a person's hands. The hygienic face towel includes a hygienic interior surface forming an interior space; an exterior surface covering the hygienic interior surface; an opening that extends through the exterior surface and the hygienic interior surface, the opening providing access to the interior space; at least one hand flap connected to the exterior surface and hygienic interior surface; and at least one finger loop disposed on the exterior surface, where the hygienic face towel can be manipulated to an inverted state by pushing on the exterior surface at the location of the finger loop, and the hygienic face towel can be manipulated from the inverted state to an un-inverted state by pulling on the at least one finger loop.

16 Claims, 11 Drawing Sheets

HYGIENIC FACE TOWEL

This application claims the benefit of and priority under 35 U.S.C. § 119(e) to U.S. Ser. No. 63/219,725, filed Jul. 8, 2021, the contents of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to hygiene safety and maintenance devices for use in various fields including, but not limited to, medical, industrial, chemical, and recreational activities. More particular, the invention relates to a hygienic face towel that maintains a hygienic surface that can be touched to a user's face or body part without transferring contaminants from objects in the surrounding environment or the user's hands to the user's face or body part.

BACKGROUND

The global coronavirus pandemic highlighted the dangers of picking up contaminants from objects in the environment, thereby risking infection. The importance of practicing proper hygiene is a key aspect in the ongoing fight to prevent the spread of the coronavirus and other diseases. Early recommendations to prevent infection were to wash hands frequently (for at least 20 seconds) and to avoid touching one's face with their hands after touching objects in the environment that might still carry the highly contagious SARS-CoV-2 virus (aka the "coronavirus"). Disease transmission studies confirmed that the coronavirus could travel from surface to hand to face thereby causing infection. Across the United States and the World, as people were forced to adapt to their new reality, practicing safe hygiene habits was critical to the successful response to the deadly coronavirus.

Techniques to reduce spread of diseases that were learned during the coronavirus pandemic can be applied across numerous industries. The need to maintain a hygienic wiping surface that is free from contaminants spans more than one profession or activity. For example, a doctor may want to avoid using their hands to wipe sweat from their face. A lab scientist may want to ensure that some lab tools remain sanitary and avoid cross-contamination due to spills, overflows, or from skin to device contact. A manufacturing worker may face similar issues when working with sensitive materials in hot environments. A weightlifter in the gym wants to wipe sweat from their face without transferring the other gym users' sweat, spit, and dirt that has been picked up on the weightlifter's hands from the gym equipment.

Across the world, people have quickly become aware of how easily diseases, toxins, or contaminants can be transferred from surfaces we touch throughout our daily lives directly to our face or head. A person using public transportation runs the risk of grasping a contaminated railing, picking up the contaminating substance on their hand, and inadvertently transferring that substance to their eyes, nose, mouth or face, thereby risking infection. While washing hands frequently or using hand sanitizer can be effective to reduce contaminants on a person's hands, these methods for preventing the spread of contagious diseases are not practical in all situations. For example, if a person is performing an activity that requires constant touching of objects in the surrounding environment, the person many not be able to stop their activity to use hand sanitizer or wash their hands before touching their face. Moreover, too frequent-use of hand washing and/or hand sanitizer can lead to overly dry skin—leading to a host of other problems. For such situations—where constant or continued touching of possibly contaminated objects in the environment occurs—a novel solution is needed that can allow a user to continue their activity, yet allow them to wipe sweat, water, etc. from their face using a sanitary surface. The novel features of the invention disclosed herein provide such advantageous features not found in the prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

In one exemplary embodiment, a hygienic face towel is disclosed comprising an interior surface forming an interior space; an exterior surface covering the interior surface; an opening that extends through the exterior surface and the interior surface, the opening providing access to the interior space; at least one hand flap connected to the exterior surface and interior surface; and at least one finger loop disposed on the exterior surface, wherein the hygienic face towel can be manipulated to an inverted state by pushing on the exterior surface at a location of the finger loop, and the hygienic face towel can be manipulated from the inverted state to an un-inverted state by pulling on the at least one finger loop.

According to some embodiments, the interior surface is comprised of an absorbent material.

According to some embodiments, the exterior surface is comprised of an impermeable or semi-impermeable material that prevents contaminants from passing through the exterior surface to the interior surface.

According to some embodiments, the finger loop is disposed on a first end of the exterior surface and the opening is disposed on a second end of the exterior surface, the second end and first end being opposing ends of the exterior surface.

According to some embodiments, the at least one hand flap is shaped like a half circle.

According to some embodiments, the at least one hand flap is disposed adjacent to the opening, and the at least one hand flap can be held to assist in manipulating the hygienic face towel between the inverted and un-inverted states.

According to some embodiments, the at least one hand flap includes a closing device that maintains the hygienic face towel in a closed state.

According to some embodiments, the closing device is at least one of a magnet, a button, a hook-and-loop fastener, hooks, or snaps.

According to some embodiments, the at least one hand flap includes at least two hand flaps.

According to some embodiments, the at least two hand flaps are located on opposite sides of the opening from each other.

According to some embodiments, the at least two hand flaps can be held to assist in manipulating the hygienic face towel between the inverted and un-inverted states.

According to some embodiments, each of the at least two hand flaps include a closing device that maintains the hygienic face towel in a closed state.

According to some embodiments, each closing device is at least one of a magnet, a button, a hook-and-loop fastener, hooks, or snaps.

According to some embodiments, each of the at least two hand flaps are shaped like half circles, and curved edges of the at least two hand flaps meet an edge of the exterior surface at adjacent points.

According to some embodiments, the finger loop is disposed on a first end of the exterior surface, the at least one hand flap is disposed on a second end of the exterior surface, the second end and first end being opposing ends of the exterior surface.

According to some embodiments, the at least one hand flap is a made from a different material than the exterior surface and the interior surface.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
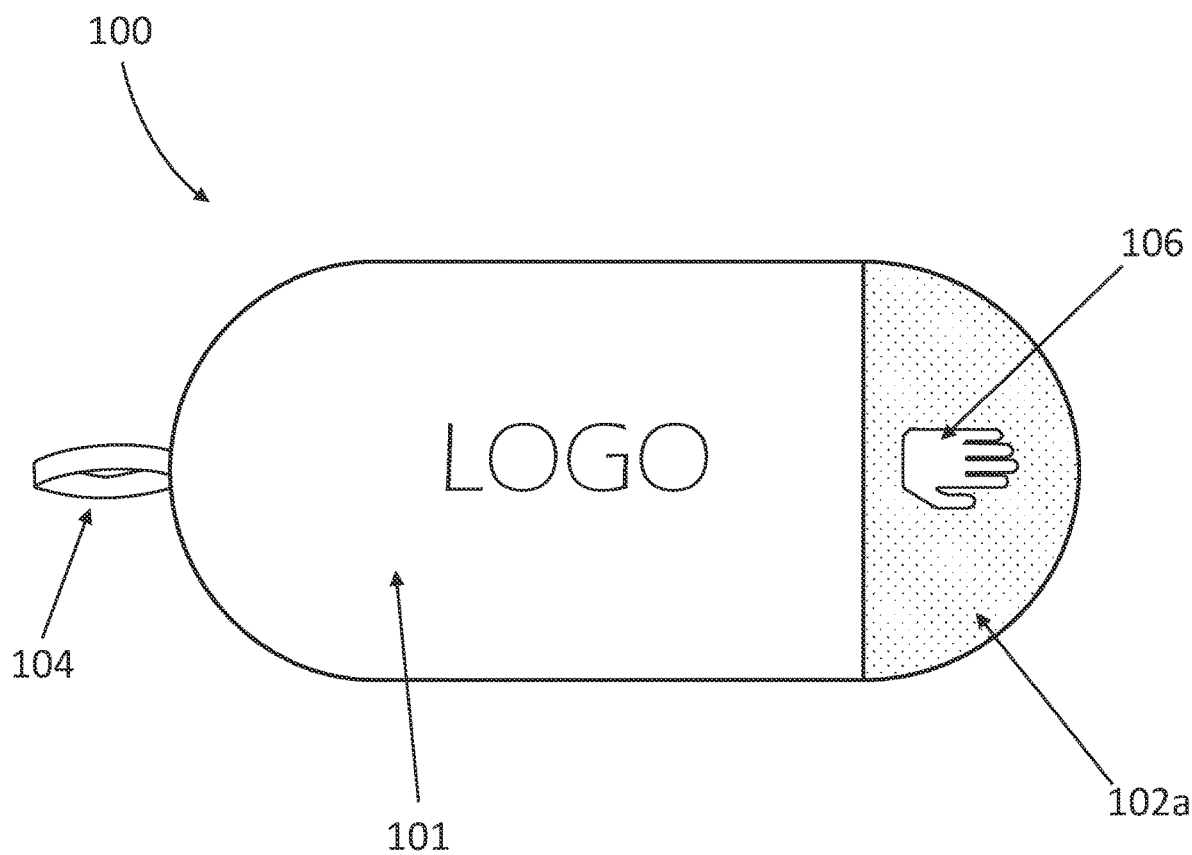
FIG. 1 shows a view of the front side of the invention according to an exemplary embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Embodiments of the present invention relate to a hygienic face towel that can be used to safely wipe a user's face or other body part while protecting the user from germs, contaminants, hazard materials, or diseases that may be on a user's hand.

In some embodiments, the invention is a hygienic face towel that maintains a hygienic interior surface that is protected from contaminants, including those that may be on a user's hand. The exterior surface of the hygienic face towel is made a semi to fully non-permeable fabric be made of a natural or synthetic fibers, or a combination of both, like but not limited to nylon, polyester, wax cotton, microfiber, neoprene, Gore-Tex, etc. and the inner surface is made of any soft, absorbent natural or synthetic fabrics or a combination of both such as but not limited to cotton, polyester, rayon, nylon, polypropylene, bamboo, etc. that can safely contact a user's face or other body part that may be vulnerable to infection, contamination, or hazardous materials. In addition, embodiments of the invention may include hand flaps which designate an area for the user to hold when manipulating the hygienic face towel to the inverted or un-inverted states. Embodiments of the invention may also include a finger loop that the user can grasp when manipulating the hygienic face towel from or to the inverted state or the un-inverted state. Embodiments of the invention thus provide an intuitive design that is easy to use, yet consistently protects a user from transferring contaminants, diseases, germs, and/or hazardous materials from their hand to their face or other vulnerable body area.

Figure 2:
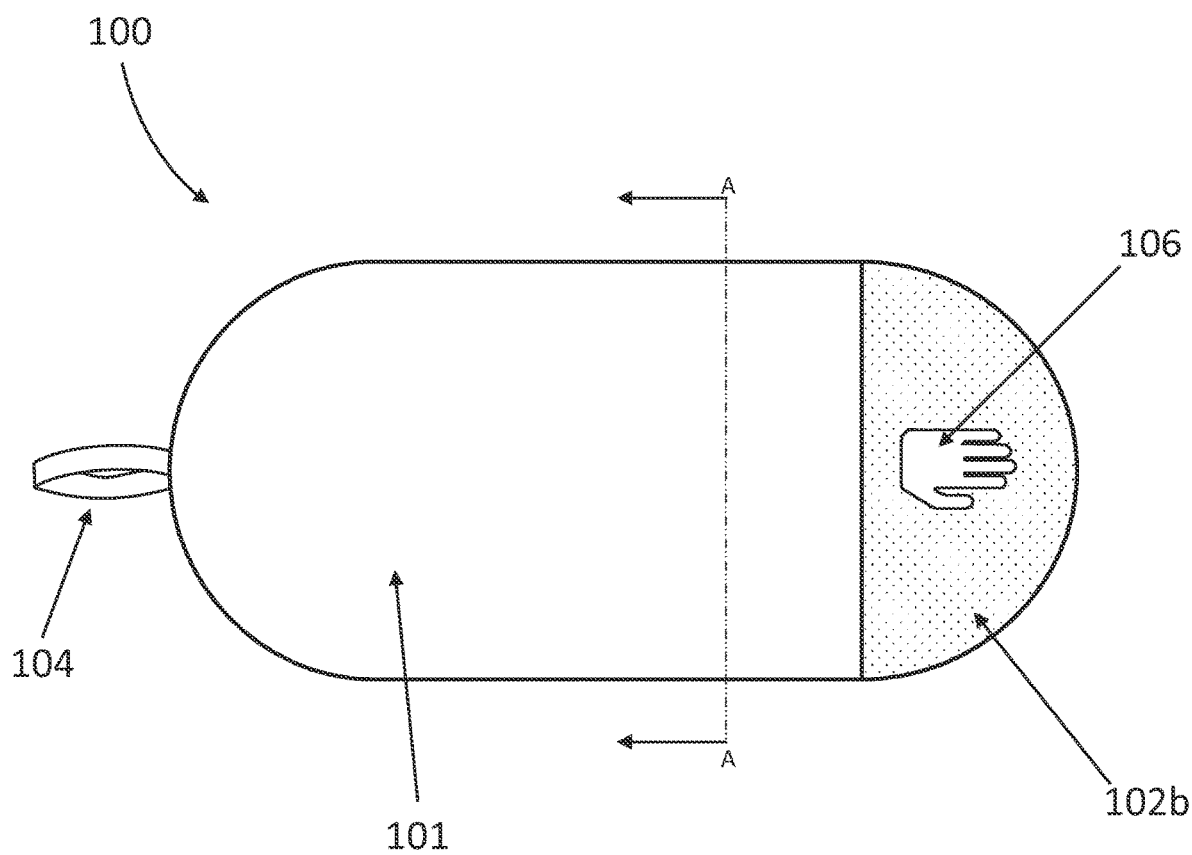
FIG. 2 shows a view of the back side of the invention according to the embodiment of FIG. 1.

FIG. 1 shows an exterior view of a front side of a hygienic face towel 100 according an embodiment of the invention. The hygienic face towel 100 may include a main exterior surface 101, hand flaps 102a and 102b, hygienic interior surface 103, and finger loop 104. FIG. 2 shows an view of a back side of the hygienic face towel 100. The terms "front" and "back" are used for reference only. A person of ordinary skill in the art would appreciate that, when in use, either side of the hygienic face towel 100 may serve as the "front" or "back." As shown in FIG. 2, in some embodiments of the invention, both sides of the hygienic face towel 100 may be approximately identical. In other embodiments of the invention, the front and back sides of the hygienic face towel 100 may be configured with different shapes, materials, textures, graphics, or the like. For example, although FIG. 1 shows the "front" side with a logo or graphic, the graphic or logo can be placed on either or both "front" and "back" sides of the hygienic face towel.

Figure 3:
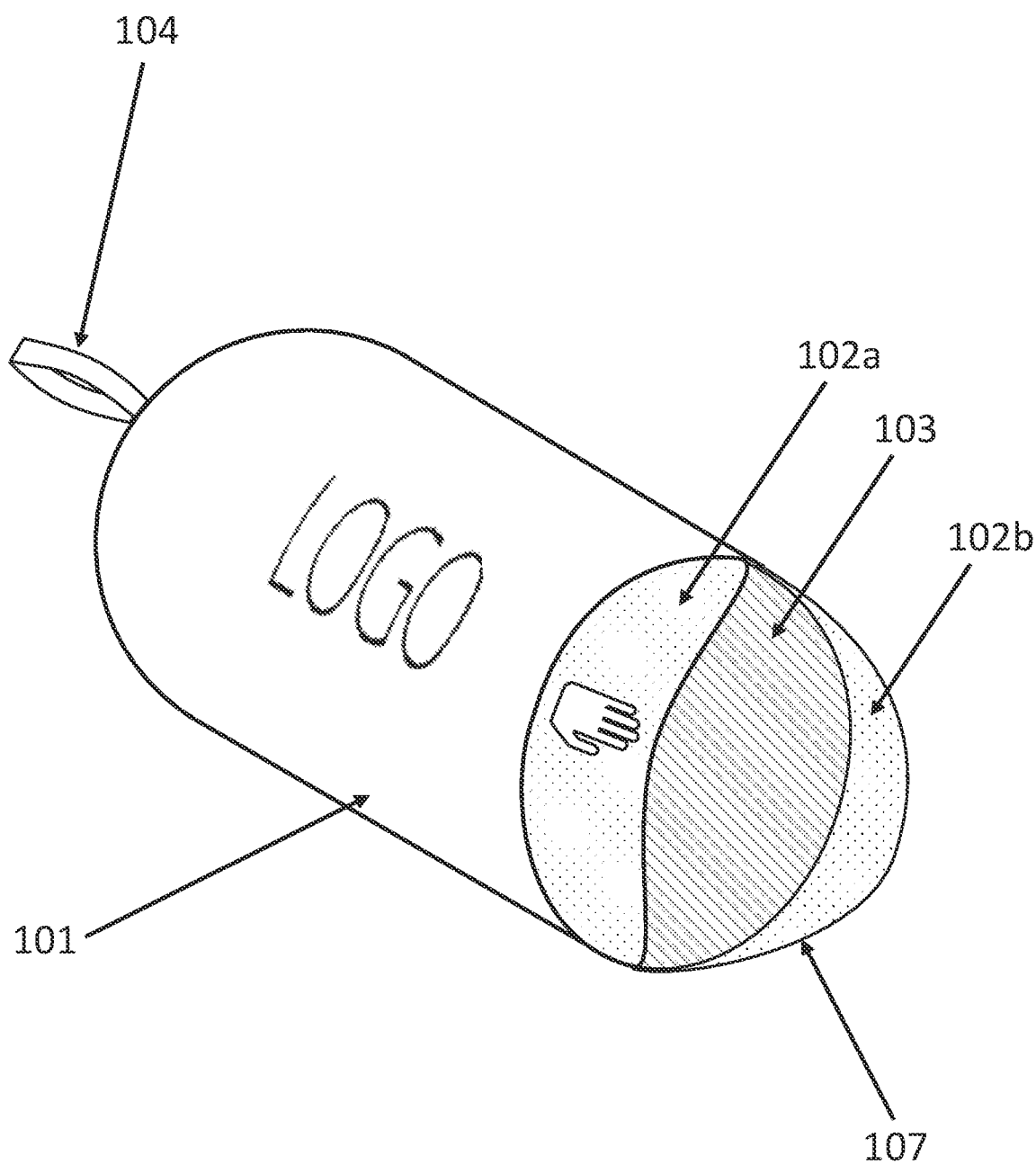
FIG. 3 shows an isometric view of the invention according to the embodiment of FIG. 1.

The main exterior surface 101 of the hygienic face towel 100 may be made of a flexible and durable material that comes into contact with the environment and with a user's hands. The main exterior surface 101 is designed to be the "non-hygienic" side of the device that comes into contact with surfaces or objects, including a user's hands, that might have contaminants, including viruses or diseases. In some embodiments, the main exterior surface 101 may be waterproof, semi-waterproof, impermeable, or semi-impermeable so that contaminants, diseases, viruses, saliva, sweat, etc. cannot not pass through the exterior surface 101 to the hygienic interior surface 103 (see FIG. 3). Thus, the hygienic interior surface 103 remains safe to touch the face or other vulnerable area of the user because the main exterior surface 101 protects the interior surface 103 from contaminants. In some embodiments the main exterior surface 101 is made from a single piece of fabric with a single seam to form a pocket-like shape. In other embodiments, the main exterior surface 101 is made by joining two or more separate pieces of material.

The hand flaps 102a and 102b also contribute to the hygienic use of the invention. The hand flaps are connected to the main exterior surface 101 and the hygienic interior surface 103. The hand flaps can be connected to the main exterior surface 101 and hygienic interior surface 103 using known methods including, but not limited to, by being sewn together or being adhered together using a durable adhesive. The hand flaps 102a and 102b can have many shapes so long as they do not prevent the inversion of the hygienic face towel 100. For example, FIG. 1 shows the hand flaps as having approximately half-circle shape. As shown in FIG. 2, the curved edges 107 of the hand flaps curve towards each other and meet the exterior main surface at adjacent points. This arrangement allows the hygienic face towel 100 to be more easily inverted since the hand flaps can held by the hand holding area 106 and pulled while the user pushes their hand into the exterior surface at the finger loop 104 (see discussion of FIGS. 6A-6C below).

Figure 4:
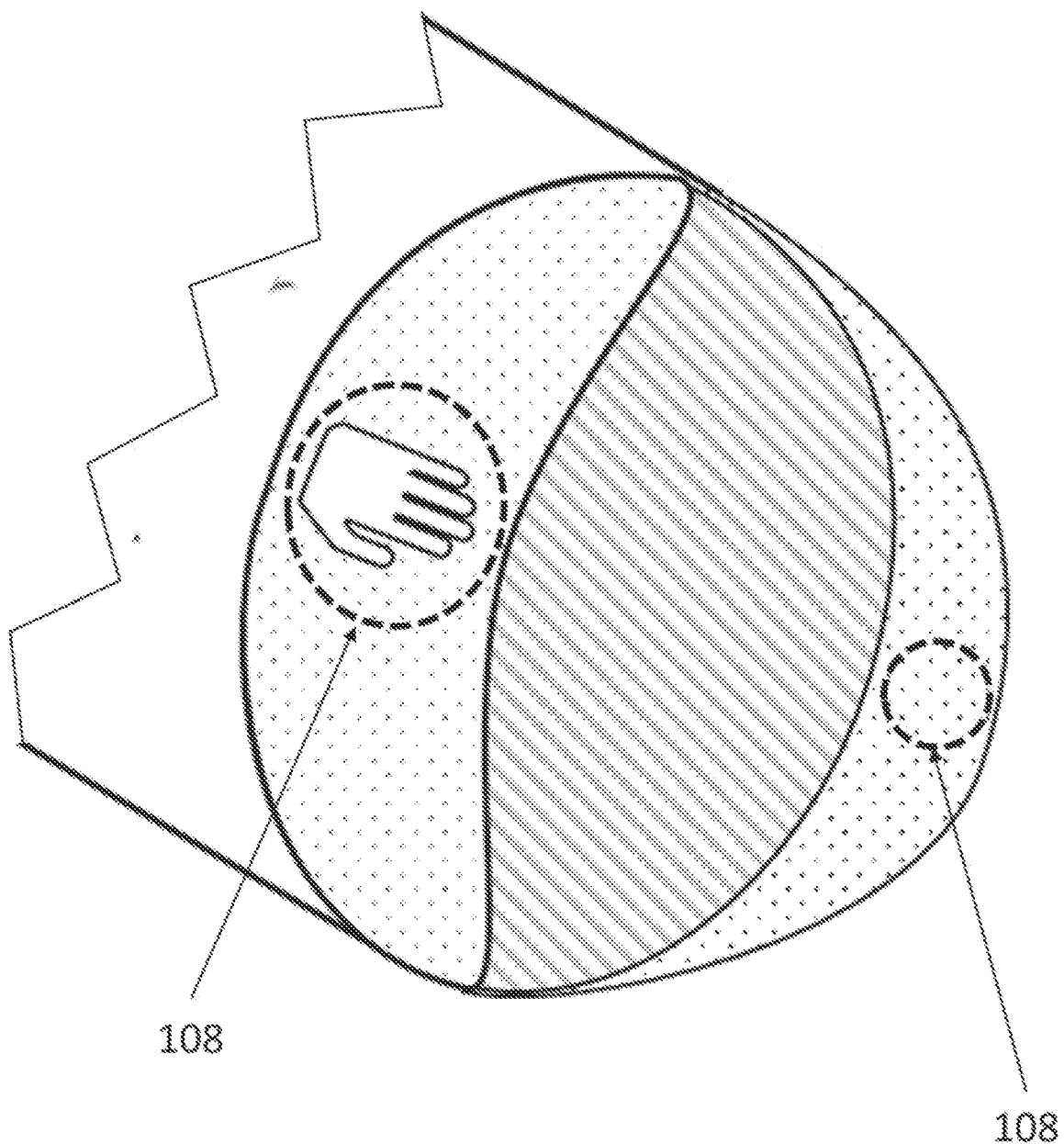
FIG. 4 is a zoomed in partial view of FIG. 3.

As shown in FIG. 4, the hand flaps 102a and 102b may also includes closing devices such as magnets (shown as the dotted circles 108) which keep the hygienic face towel 100 in a closed state when not being manipulated to the inverted or un-inverted states. In other embodiments, other fastening means can be used instead of magnets including, but not limited to, buttons, zippers, hook and loop fasteners, hooks, snaps, or the like, so long as the fasteners keep the hygienic face towel 100 in a closed state which helps to prevent contamination of the hygienic interior surface 103 when the hygienic face towel 100 is in the closed state. In addition, although FIG. 4 shows one magnet 108 is shown for each hand flap 102a and 102b, more than one magnet can be disposed in each of the hand flaps 102a, 102b and/or different shaped magnets may be used. In some embodiments, the magnets 108 are disposed inside of the hand flaps 102a and 102b so that the magnets are not exposed to the exterior environment. In other embodiments, the magnets may be secured to the surfaces of the hand flaps 102a, 102b so that when the hygienic face towel 100 is in the closed state, the magnets 108 are in direct contact with each other. The skilled artisan will appreciate that other methods that are not particularly described in this application which can be used to secure the hygienic face towel in a closed state may be employed in the invention without departing from the scope of the disclosure. It will be appreciated that the closing devices prevent contamination of the hygienic interior surface 103 by maintaining the hygienic face towel in a closed state even when the device is dropped or placed on a potentially contaminated object (e.g. the floor, gym equipment, etc).

Figure 5:
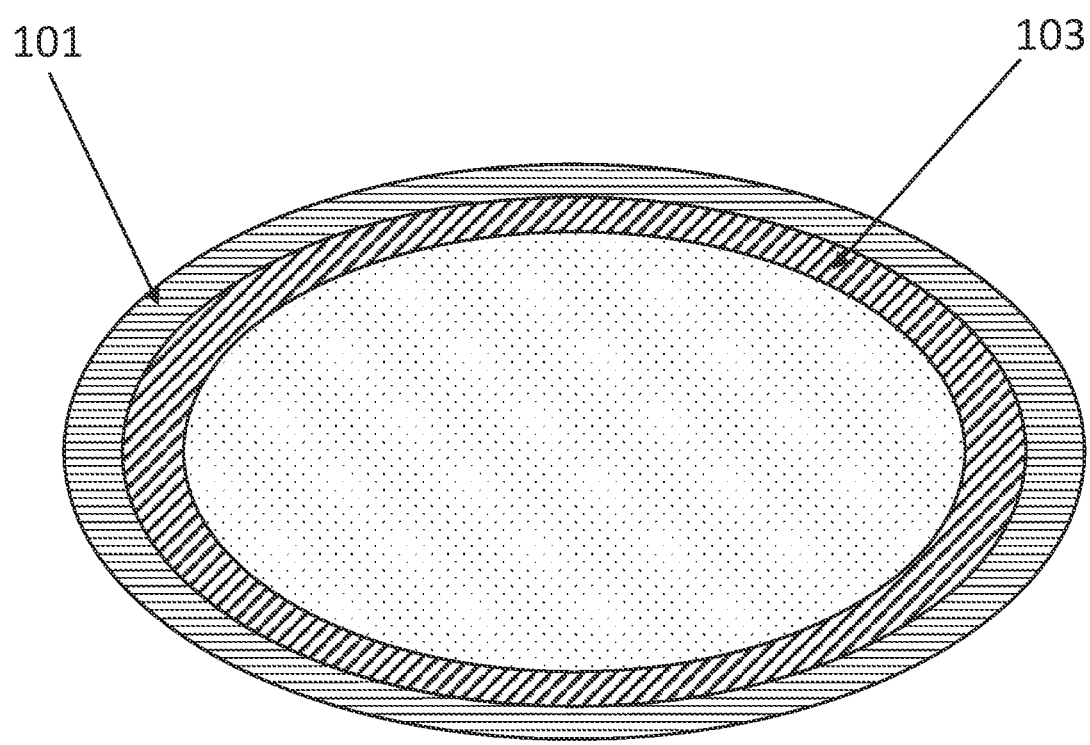
FIG. 5 shows a cross-sectional view along line A-A according to the embodiment of FIG. 2.

FIG. 5 shows a cross sectional view of the hygienic face towel 100 along line A-A in FIG. 2. As shown in FIG. 5, the hygienic face towel 100 may have two layers of material: the main exterior surface material 101 and the hygienic interior surface 103. The layer that makes up the main exterior surface 101 may be made from a different material than the layer that makes up the hygienic interior surface 103. As discussed above, the main exterior surface 101 is designed to be separate from the hygienic interior surface 103 to prevent contamination of the hygienic interior surface 103. In some embodiments, the main exterior surface material 101 and the hygienic interior surface 103 are joined together with any suitable connecting means such as adhesive or sewing in a permanent or semi-permanent manner. In other embodiments, the main exterior surface material 101 and the hygienic interior surface 103 may be joined through detachable means such as buttons, hook and loop fasteners (e.g. Velcro), zippers, or the like. The detachable connection arrangement may allow the main exterior surface material 101 and the hygienic interior surface 103 to be separated and cleaned separately in order to further protect the materials from cross-contamination.

Returning to FIG. 1, the contributions of the finger loop 104 will be discussed. The finger loop 104 and hand flaps 106 together contribute to preventing contamination of the hygienic interior surface 103. In particular, the finger loop 104 allows a user to manipulate the hygienic face towel 100 to the un-inverted state after using the device to, for example, wipe sweat from their face. The finger loop 104 may be made from a durable and flexible material such as, but not limited to, nylon, polyester, cotton, or the like. FIGS. 6A-6C and 7A-7C show how the finger loop 104 contributes to manipulation of the hygienic face towel 100.

Figure 6A:
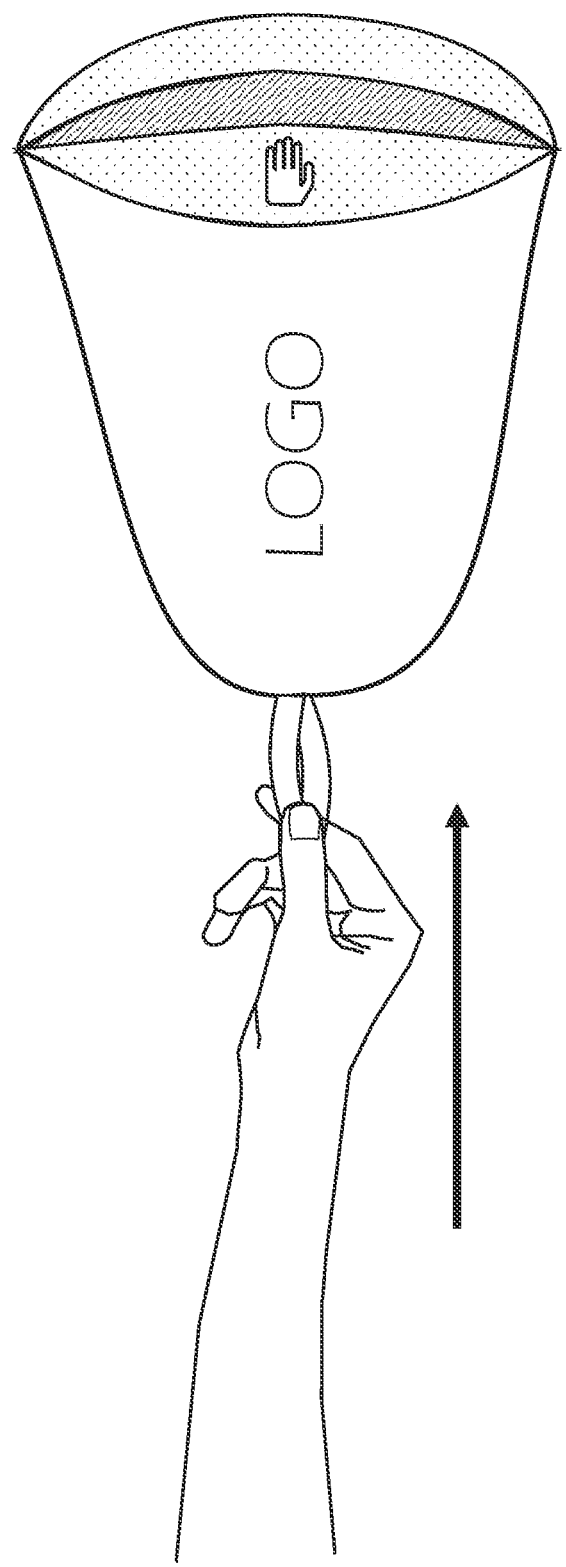
FIGS. 6A-6C show the process of manipulating the hygienic face towel to the invert state in a hygienic manner according to the embodiment of FIG. 1.
Figure 6B:
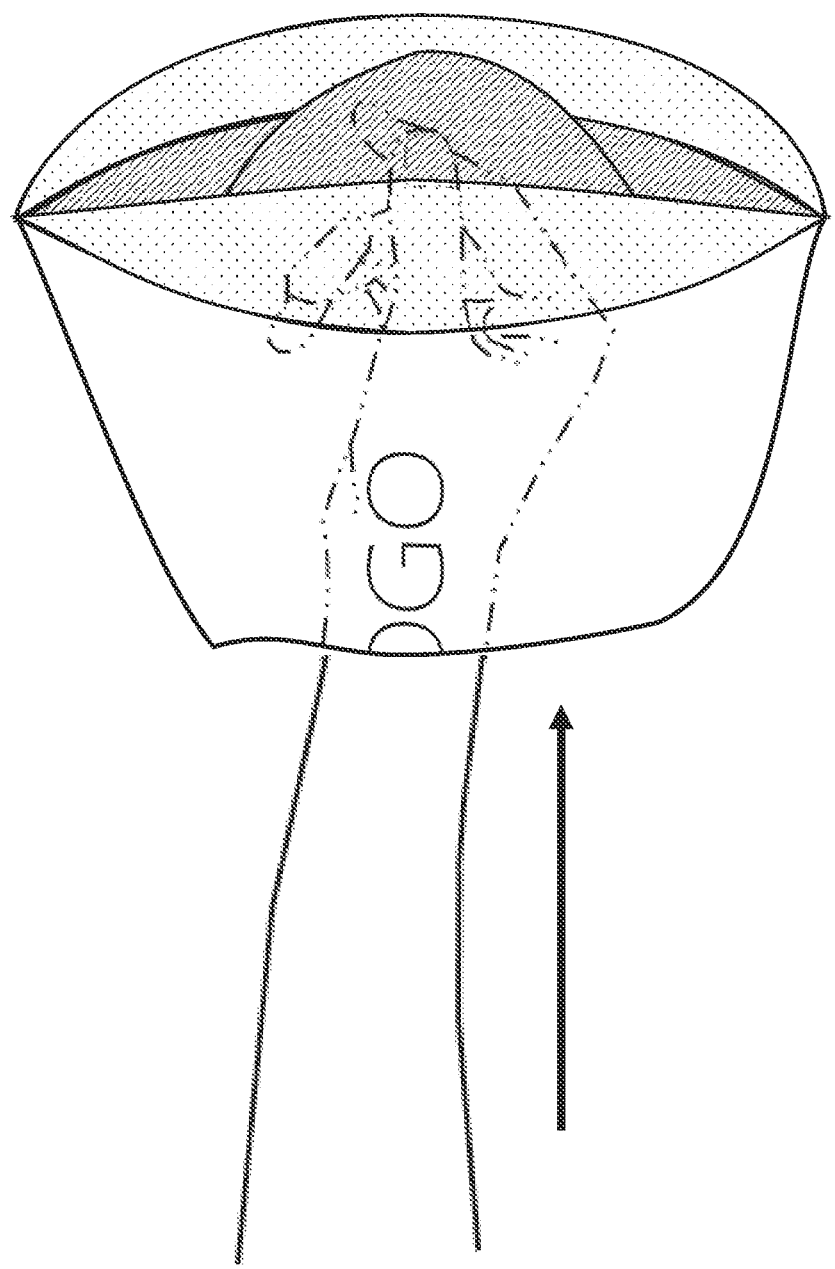
Figure 6C:
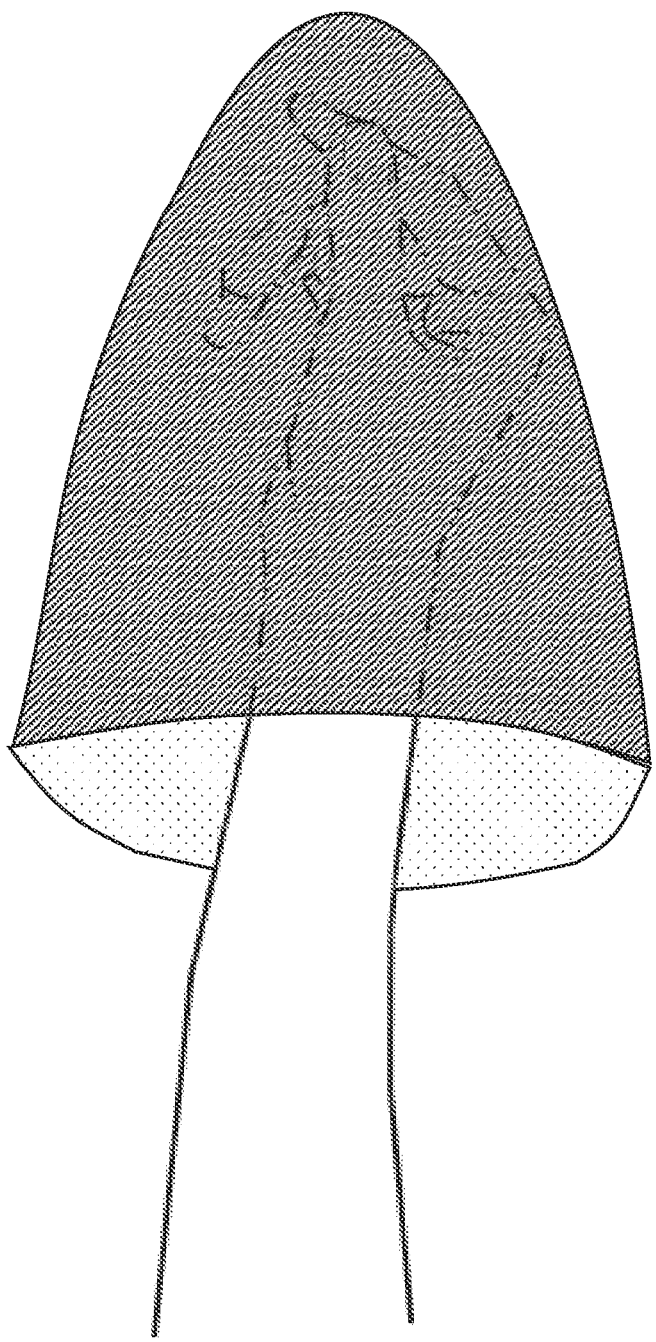

FIGS. 6A-6C how the process of manipulating the hygienic face towel 100 to the inverted state so that the hygienic interior surface 103 is exposed and can be subsequently used. First, as shown in FIG. 6A, a user may grasp the finger loop, or simply press on the main exterior surface 101 where the finger loop is attached to the main exterior surface. At the same time, the user may grasp one of the hand flaps 102a or 102b with their other hand and pull the hand flap toward the bottom of the main exterior surface 101 (i.e. toward the finger loop 104) to invert the hygienic face towel 100 and expose the hygienic interior surface 103. FIG. 6B shows the hygienic hand towel in a partially inverted state. As the user continues the movement, they will fully invert the hygienic face towel 100 as shown in FIG. 6C. In this position, a user can use the hand that is inside the hygienic face towel 100 to touch surfaces or objects that they do not want to transfer any contaminants, germs, or diseases to. For example, a weightlifter in a gym may want to avoid touching their face with their hands because of the risks of transferring germs from other gym users to their own face. However, by using the hygienic face towel according to the invention a user can wipe sweat from their face with the hygienic interior surface 103 of the hygienic face towel 100 without transferring any contaminants that might be on their hand.

Figure 7A:
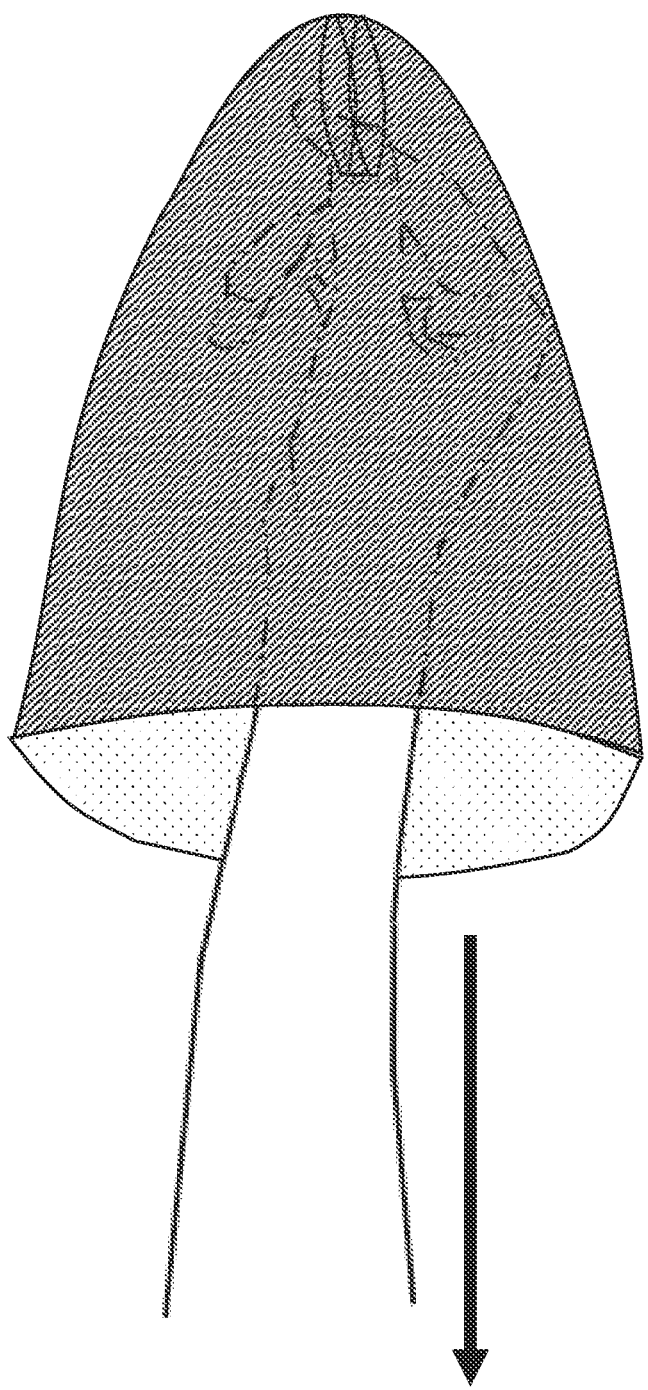
FIGS. 7A-7C show the process of manipulating the hygienic face towel to the un-inverted state in a hygienic manner according to the embodiment of FIG. 1.
Figure 7B:
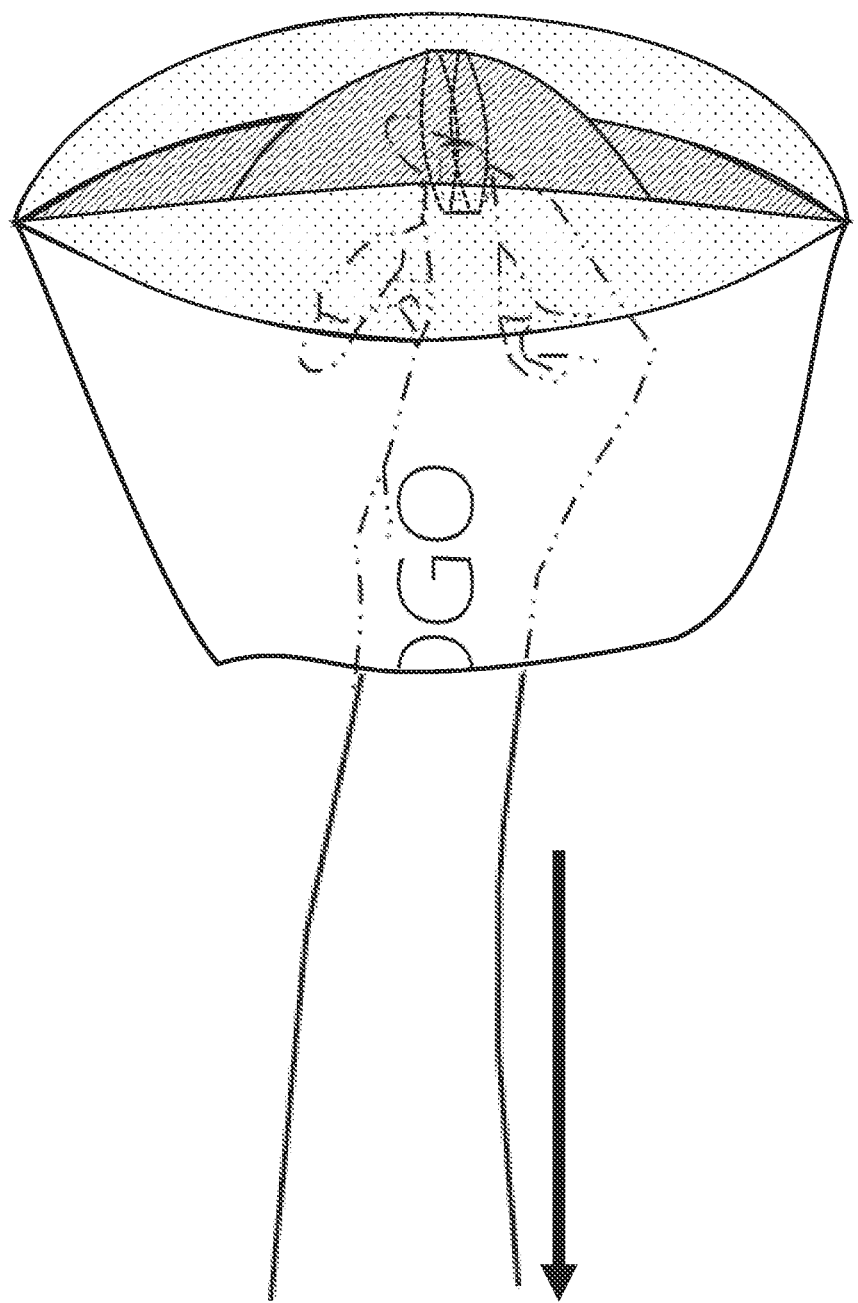
Figure 7C:
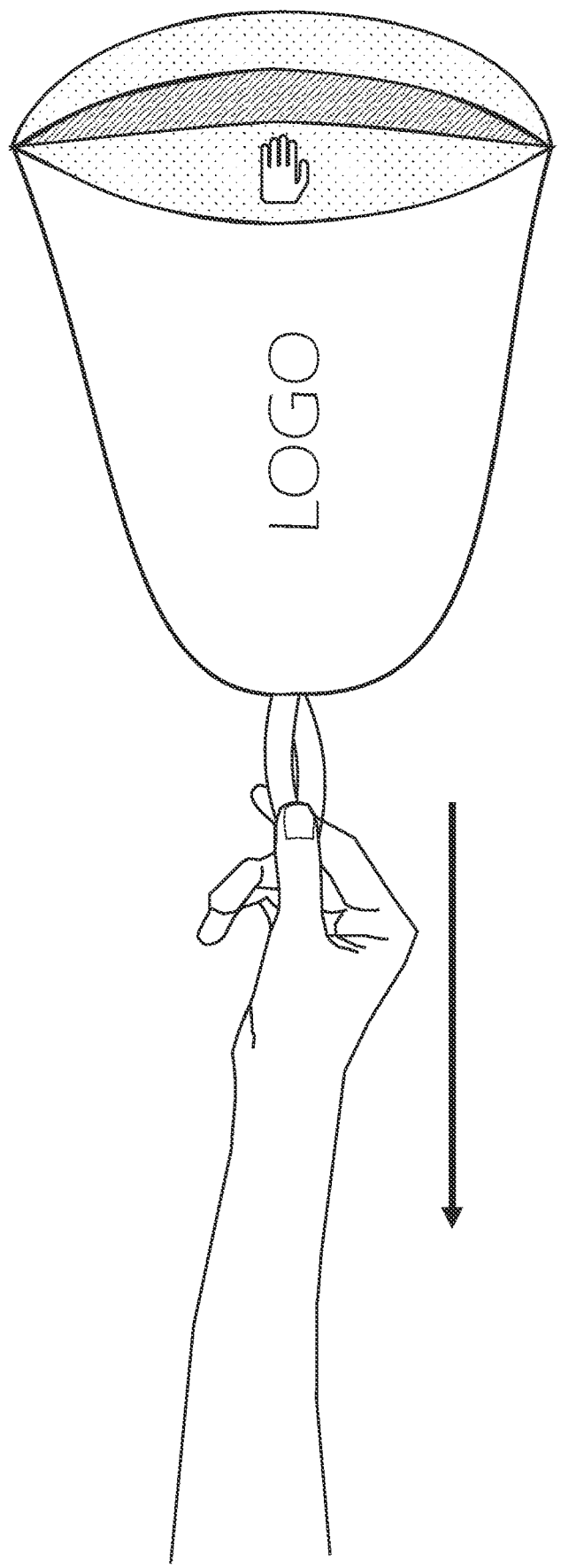

Moreover, the invention is designed to maintain the hygienic nature of the interior surface 103. FIGS. 7A-7C show the process of manipulating the hygienic face towel 100 from the inverted state to the un-inverted state so that the hygienic interior surface is returned to the interior of the hygienic face towel and is returned to a protected state. The process of manipulating the hygienic face towel to the un-inverted state starts in FIG. 7A. The user grasps the finger loop 104 with the hand that is already inside of the hygienic face towel 100. With the other hand, the user will grab one of the hand flaps 102a, 102b and will pull the finger loop and hand flaps in opposite directions to un-invert the hygienic face towel 100 and return the hygienic face towel to the closed state where the interior surface 103 is protected from contamination. FIG. 7B shows the partially un-inverted state of the hygienic face towel 100 and FIG. 7C shows the un-inverted state of the hygienic face towel 100.

The finger loop 104 and the hand flaps 102a and 102b contribute to allowing the user to completely avoid contacting the hygienic interior surface 103 when manipulating the hygienic face towel to either inverted or un-inverted states. Therefore, the user's hands which may have picked up contaminants, diseases, viruses, germs, hazard materials, etc. do not contaminate the interior surface 103 and the interior surface 103 can safely come into contact with parts of the user's body which may be susceptible to infection (e.g. eyes, mouth, face, etc.).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A hygienic face towel comprising:
    a hygienic interior surface made from a first material forming an interior space;
    an exterior surface made from a second material covering the interior surface;
    an opening that extends through the exterior surface and the hygienic interior surface, the opening providing access to the interior space;
    at least one hand flap connected to the exterior surface and hygienic interior surface, wherein the at least one hand flap is a made from a different material than the exterior surface and the hygienic interior surface; and
    at least one finger loop disposed on the exterior surface,
    wherein the hygienic face towel can be manipulated to an inverted state by pushing on the exterior surface at a location of the finger loop, and
    the hygienic face towel can be manipulated from the inverted state to an un-inverted state by pulling on the at least one finger loop.

2. The hygienic face towel of claim 1, wherein the hygienic interior surface is comprised of an absorbent material.

3. The hygienic face towel of claim 1, wherein the exterior surface is comprised of an impermeable or semi-impermeable material that prevents contaminants from passing through the exterior surface to the hygienic interior surface.

4. The hygienic face towel of claim 1, wherein the finger loop is disposed on a first end of the exterior surface and the opening is disposed on a second end of the exterior surface, the second end and first end being opposing ends of the exterior surface.

5. The hygienic face towel of claim 1, wherein the at least one hand flap is shaped like a half circle.

6. The hygienic face towel of claim 1, wherein
    the at least one hand flap is disposed adjacent to the opening, and
    the at least one hand flap can be held to assist in manipulating the hygienic face towel between the inverted and un-inverted states.

7. The hygienic face towel of claim 1, wherein the at least one hand flap includes a closing device that maintains the hygienic face towel in a closed state.

8. The hygienic face towel of claim 7, wherein the closing device is at least one of a magnet, a button, a hook-and-loop fastener, hooks, or snaps.

9. The hygienic face towel of claim 1, wherein the at least one hand flap includes at least two hand flaps.

10. The hygienic face towel of claim 9, wherein the at least two hand flaps are located on opposite sides of the opening from each other.

11. The hygienic face towel of claim 9, the at least two hand flaps can be held to assist in manipulating the hygienic face towel between the inverted and un-inverted states.

12. The hygienic face towel of claim 9, wherein the at least two hand flaps include a closing device that maintains the hygienic face towel in a closed state.

13. The hygienic face towel of claim 12, wherein each closing device is at least one of a magnet, a button, a hook-and-loop fastener, hooks, or snaps.

14. The hygienic face towel of claim 9, wherein
    each of the at least two hand flaps are shaped like half circles, and
    curved edges of the at least two hand flaps meet an edge of the exterior surface at adjacent points.

15. The hygienic face towel of claim 1, wherein
    the finger loop is disposed on a first end of the exterior surface,
    the at least one hand flap is disposed on a second end of the exterior surface, the second end and first end being opposing ends of the exterior surface.

16. The hygienic face towel of claim 1, wherein the hygienic interior surface is removably attached to the exterior surface.

* * * * *